INVENTOR
PETER JOHANNES HUBERTUS JANSSEN
BY Fred M. Vogel
AGENT

INVENTOR
PETER JOHANNES HUBERTUS JANSSEN
BY Fred M. Vogel
AGENT 2,816,164

CIRCUIT ARRANGEMENT FOR SYNCHRONIZING THE LINE DEFLECTION CIRCUIT IN A TELEVISION RECEIVER

Peter Johannes Hubertus Janssen, Eindhoven, Netherlands, assignor, by mesne assignments, to North American Philips Company, Inc., New York, N. Y., a corporation of Delaware Application May 25, 1955, Serial No. 510,983

Claims priority, application Netherlands June 14, 1954

5 Claims. (Cl. 178—69.5)

The invention relates to a circuit arrangement for synchronizing the line deflection circuit in a television receiver, in which positive going line synchronizing pulses are supplied to a control grid of a tube and in which in the anode circuit of the tube a direct voltage counteracting the conductivity of the tube and additional pulses are set up in series, which additional pulses are derived from the fly-back pulses produced in the line deflection circuit during the fly-back of the line sawtooth oscillation, the negative control direct voltage set up in the anode circuit of the tube being supplied to a control electrode of a tube of the line deflection circuit for controlling the frequency.

In known circuit arrangements of this kind, in which as is common practice, not only the line synchronizing pulses but also the picture synchronizing pulses are supplied to the control grid of the first-mentioned tube whilst the fly-back pulses are supplied to the anode of said tube, various difficulties arise which will be described more fully hereinafter.

It is an object of the circuit arrangement in accordance with the invention to avoid these difficulties; according to the invention a circuit arrangement for synchronizing the line deflection circuit in a television receiver is characterized in that the additional pulses are derived from the fly-back pulses through a network such that the additional pulses only cause the anode potential of the first-mentioned tube to be increased to exceed the cathode potential during a period which at a maximum is 49% of the duration of a line synchronizing pulse and, in addition, the line deflection circuit is such that the frequency of the produced sawtooth oscillation increases as the control direct voltage is driven more negative.

Figure 1:
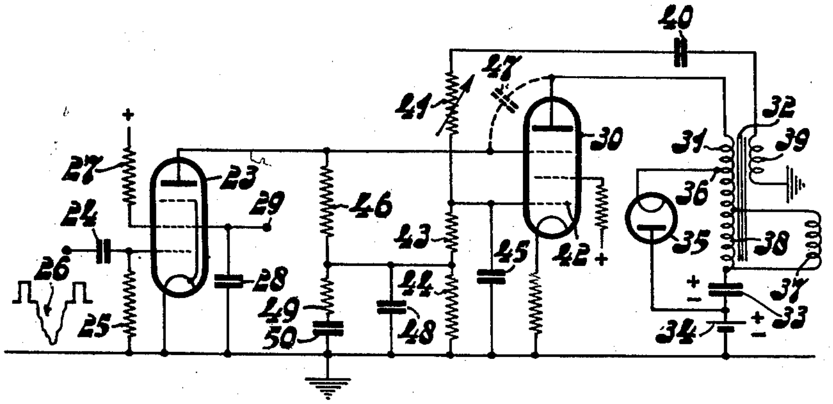
Figures 2, 3, 4:
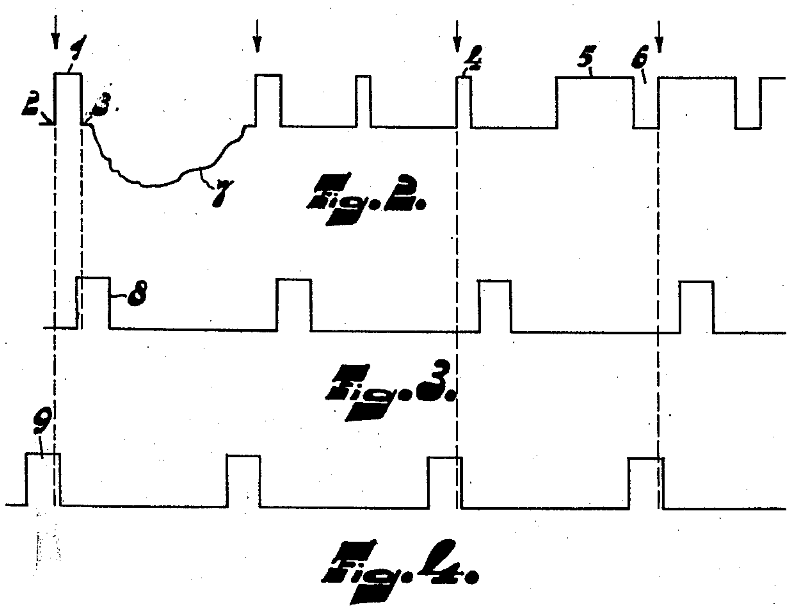
Figure 5:
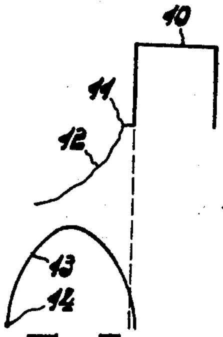
Figure 6:
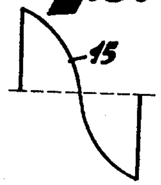
Figure 7:
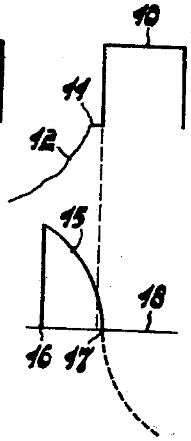
Figure 8:
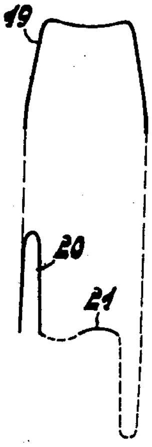
Figure 9:
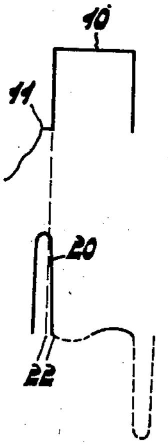

The invention will now be described more fully with reference to the accompanying drawing, in which Fig. 1 shows an embodiment of the circuit arrangement in accordance with the invention, Fig. 2 is a diagram of part of the picture and synchronizing signal of the kind used in many countries, Figures 3 and 4 show the fly-back pulses set up in the line deflection circuit in two different phases with respect to the synchronizing signals shown in Fig. 2, Fig. 5 shows a position of a fly-back pulse relative to a line synchronizing pulse, Fig. 6 shows an additional pulse obtained from the fly-back pulse shown in Fig. 5 by differentiation, Fig. 7 shows the position of the additional pulse shown in Fig. 6 relative to a line synchronizing pulse, Fig. 8 shows a fly-back pulse of a shape which slightly differs from that shown in Fig. 5, and the additional pulse obtained therefrom by differentiation, and Fig. 9 shows the position of the last-mentioned additional pulse relative to a line synchronizing pulse.

The picture and synchronizing signal shown in Fig. 2 comprises line synchronizing pulses 1 comprising a front pedestal 2 and a back pedestal 3, the components 1, 2 and 3 together constituting the line suppression interval.

In addition, equalizing pulses 4 are shown the duration of which is half that of a line synchronizing pulse. For the sake of simplicity only two of said pulses are shown in the figure, although in most systems six such pulses are used. As an alternative, said pulses may be dispensed with. The picture synchronizing pulse 5 is interrupted by negative going pulses 6 the duration of which is equal to that of a line synchronizing pulse. Finally, the picture signal appearing between two line suppression intervals is designated 7.

It is well known to compare the phase of such a synchronizing signal with respect to the fly-back pulses of the line deflection circuit. For this purpose the signal shown in Fig. 2 is supplied with the shown polarity to the control grid of a tube. To the anode of the tube the fly-back pulses are supplied in series with a direct voltage counteracting the conductivity of the tube. Thus, the tube is only conductive during the periods in which part of the synchronizing signal coincides with the occcurrence of the fly-back pulses. The anode current passed by the tube is supplied to an integrating network which is connected in the anode circuit and across which a negative control voltage is set up which acts to control the frequency of the line deflection circuit. In the known circuit arrangements the line deflection circuit is such that the frequency decreases as the control voltage is driven more negative. Consequently the tube which acts as the phase comparison stage must be adjusted so that use is made of the coincidence of the trailing edge of the line synchronizing pulse with the leading edge of the fly-back pulse. It should be noted that a line deflection circuit may also be controlled in frequency if it is of the kind the frequency of which increases as the control voltage is driven more negative, but that in the known circuit arrangement the obtained control voltage for this purpose must be amplified in a phase inverter tube.

In Fig. 3 the fly-back pulses 8 are shown in that position relative to the synchronizing signal shown in Fig. 2 in which in known manner as described hereinbefore the trailing edges of the line synchronizing pulses 1 just coincide with the leading edges of the fly-back pulses. Thus, an amount of anode current is produced in the tube which is just sufficient to enable synchronisation at least in principle.

As will be seen from a comparison of Figures 2 and 3, in this event a fly-back pulse which falls within the equalizing period does not coincide with an equalizing pulse 4, whereas a fly-back pulse which falls in the period in which the picture synchronizing pulse occurs is invariably completely coincident throughout the duration of the fly-back pulse.

This provides a contribution to the control-voltage which largely exceeds that provided during the short period in which the line synchronizing pulse is coincident with the fly-back pulse, whilst this increased contribution has no relationship with the phase of the two oscillations and consequently adversely affects the desired control voltage.

For the sake of clearness it should be noted that, if, for example, the frequency of the line synchronizing pulses should be increased, these pulses would consequently be spaced apart by smaller distances in Fig. 2. If, consequently, the first pulses shown in the left hand side of the figure exhibit the shown period of coincidence, this coincidence period is decreased for the subsequent pulses. As a result less current will be passed by the tube so that the control voltage is driven less negative. Consequently the frequency of the line deflection circuit must be increased.

The first recognition on which the circuit arrangement according to the invention is based is that use must be made of a line deflection circuit the frequency variation of which responds inversely to the variation of the control voltage.

For this purpose it is necessary to use the coincidence of the leading edge of the line synchronizing pulse and the trailing edge of the fly-back pulse. As a result the position of the fly-back pulses 9 at which a serviceable control voltage is just produced will be as shown in Fig. 4. A comparison of Figures 2 and 4 shows that part of the leading edge of a line synchronizing pulse just coincides with part of the trailing edge of a fly-back pulse. It will also be observed that during the equalizing period there is coincidence of the leading edge of an equalizing pulse 4 and a fly-back pulse. Coincidence also occurs during the picture synchronizing period with the leading edge of part of the picture synchronizing pulse 5 following after an interruption pulse 6. Each coincidence produces the same information with regard to the phase of the oscillations shown in Figures 2 and 4, since, as is shown in Fig. 2 by arrows, all leading edges which are significant in these coincidences are just those which correspond to the leading edges of the line synchronizing pulses.

Assuming the frequency of the line synchronizing pulses again to be increased, the duration of the coincidence period will also be increased and hence the current passed by the tube. Consequently, the control-voltage in the anode circuit will be driven more negative. This requires the frequency of the line deflection circuit to be increased when the control voltage is driven more negative.

The second recognition on which the invention is based is derived from the following consideration which will be described more fully with reference to Fig. 5. Fig. 5 shows a line synchronizing pulse 10 in greater detail.

Such a line synchronizing pulse has a duration which, dependent upon the various standards, is from 8% to 10% of the line interval, which interval corresponds to the spacing between the leading edges of two successive line synchronizing pulses. This pulse 10 is preceded by a front pedestal 11 the duration of which also is different from system to system but invariably is from 1% to 2% of the duration of the line synchronizing interval. This front pedestal 11 is preceded by the picture signal 12. It is desirable for the fly-back of the line deflection circuit to occur only on termination of the picture signal 12 and after the appearance of the front pedestal 11, since otherwise part of the picture signal is not reproduced. Fig. 5 also shows such a fly-back pulse 13 of a shape which is more in accordance with fact than in Figures 3 and 4, in which it was shown as a square-wave pulse for the sake of simplicity. In practice this fly-back pulse invariably is sinusoidal although, as will be described hereinafter, frequently higher harmonics will occur. The phase relationship of the line synchronizing pulse 10 and the fly-back pulse 13 is shown in Fig. 5 in a manner such that coincidence of the leading edge of the pulse 10 and the trailing edge of the pulse 13 is just obtained and a useful control voltage is just produced. It is common practice to choose the duration of the fly-back pulse so as to be less than 15% of the duration of the line interval, since this enables the fly-back to fall within the line suppression interval in all systems, which interval is shown in Fig. 2 by the front pedestal 2, the line synchronizing pulse 1 and the back pedestal 3. In Fig. 5 the duration of the fly-back pulse is made substantially equal to this 15%. It is found that the beginning of the fly-back, the point 14 in the figure, occurs at an instant which precedes the occurrence of the front pedestal 11, by approximately 12% of the duration of a line interval, so that part of the picture information is cut off. Consequently, if the fly-back pulses are used to be supplied to the anode of the phase comparison tube this results in loss of picture information.

A considerable improvement is obtainable if instead of the sinusoidal fly-back pulse 13 shown in Fig. 5 use is made of the voltage 15 shown in Fig. 6 which is obtained from said pulse by differentiation and is cosinusoidal.

Fig. 7 shows the phase relationship of the line synchronizing pulse 10 and the cosinusoidal additional pulse 15 shown in Fig. 6. It will be seen from the figure that now a much lesser part of the picture information is suppressed.

It is an object of the circuit arrangement in accordance with the invention to reduce this suppressed part of the picture information. If it is again assumed that the duration of the fly-back is approximately 15% of the line interval, with a sinusoidal fly-back the additional cosinusoidal pulse which is obtained by differentiation will have an active part the duration of which is approximately 7.5% of the said interval. The active part is that part of the additional pulse which increases the anode potential of the tube so as to exceed the cathode potential and which consequently is approximately equal to the time interval between points 16 and 17 in Fig. 7. It should be noted that the height of the pulse is not shown in the figure to scale and that the level which the pulse must exceed in order to enable the tube to become conductive is higher than the line 18 in Fig. 7. Assuming the duration of the synchronizing pulse 10 to be 10% of the line interval, the active part of the pulse 15 will be 75% of the duration of the pulse 10. According to the invention the duration of the active part of the additional pulse supplied to the anode of the phase comparison tube is 49% or less of the duration of a line synchronizing pulse. This can be ensured in various ways, a very simple way being for the fly-back pulse of the line deflection circuit to be not exactly sinusoidal but to comprise a third harmonic also. In this event the fly-back pulse may, for example, be of the shape shown as the curve 19 in Fig. 8. From this the curve 20 shown in Fig. 8 is obtained by differentiation. As will be seen from the figure, this voltage according to the curve 20 sharply rises at the beginning of the fly-back and thereupon falls off sharply. If a stronger third harmonic occurs this voltage may, after having been driven negative, become positive again at 21, with, however, an amplitude such that the anode potential of the phase comparison tube will not exceed the cathode potential.

Fig. 9 shows the phase relationship of the line synchronizing pulse 10 and the additional pulse of the shape shown by the curve 20, from which it will be seen that no picture information or substantially no picture information is suppressed.

Assuming the duration of the line synchronizing pulse to be 100 units, the duration of the front pedestal 11 is from 10 to 25 units in different systems, whilst according to the invention the duration of the active part of the additional pulse 20 at a maximum is 49 units. With an overlapping 22 as shown in Fig. 9 of approximately 20 units the fly-back at the most precedes the front pedestal 11 by approximately 19 to 4 units, i. e. 19% to 4% of the duration of a line pulse. The duration of this line pulse is approximately 10% of the line interval, so that in this event at the most approximately 2% of the picture information is suppressed. This suppression can be considerably lessened and even reduced to zero, if the duration of the active part of the additional pulse 20 is made less than 49% of the duration of a line synchronizing pulse. This can be done more readily if allowance is made for the fact that hereinbefore the duration of the fly-back pulse 19 shown in Fig. 8 is assumed to be 15% of the line interval, whereas in many receivers the fly-back period is shorter.

In the circuit arrangement shown in Fig. 1 a tube 23 which is designed as a pentode acts as a phase comparison tube and also as a synchronization separating tube. To the control grid of the tube 23 the video signal 26 comprising positive going synchronizing pulses is supplied via a capacitor 24 and a resistor 25. The time constant of the input network is chosen such that there is peak detection of the synchronizing pulses. In addition, the tube is adjusted so that the picture signal falls outside the cut-off point of the tube characteristic curve and consequently only the synchronizing signals have a controlling action.

The screen grid of the tube is connected to the supply source via a resistor 27 and between the screen grid and earth a capacitor 28 is connected. The time constant of the screen grid network is made such that the synchronizing signals for the picture deflection circuit can be derived from the screen grid at the output terminal 29.

The anode of the tube 23 is connected to the suppressor grid of a tube 30 of the line deflection circuit which in the embodiment shown is of the self-oscillating kind.

The anode circuit of the tube 30 includes the primary winding 31 of a transformer 32 in series with a capacitor 33 and the anode supply source 34. The cathode of a diode 35 is connected to a point 36 of the winding 31 and the anode of this diode 35 is connected to the positive terminal of the anode supply source. Line deflector coils 37 of a cathode ray tube (not shown) are connected to a part 38 of the primary 31. The secondary 39 of the transformer 32 is earthed at one end. The other end is connected to the control grid 42 of the tube 30 through the series combination of a capacitor 40 and a variable resistor 41. Between the control grid 42 and earth the series combination of resistors 43 and 44 is connected with which a capacitor 45 is connected in parallel. A self-oscillating deflection circuit of this kind is known per se. If a substantially saw-tooth current flows through the primary 31 of the transformer 32, a substantially constant voltage drop is produced across this winding. When the saw-tooth current flies back, a voltage pulse is produced across the winding 31 which greatly increases the potential of the anode of the tube 30. A voltage of opposite polarity is induced in the winding 39. This voltage is positive during the forward stroke of the saw-tooth current and substantially constant, whilst it exhibits a strong negative pulse at the fly-back. Through the blocking capacitor 40 this voltage is supplied to the series combination of the resistors 41, 43 and 44, which combination acts as a voltage divider. From the series combination of the resistors 43 and 44 part of this voltage, which part can be controlled by variation of the resistor 41, is derived and supplied to the control grid 42 of the tube 30. The voltage is controlled so that during the forward stroke of the saw-tooth current the control grid 42 is substantially at cathode potential. During the fly-back the tube 30 is cut-off as a result of the large negative voltage pulse set up at the control grid. During this fly-back the anode potential of the tube 30 rises so as to be pulsatory whilst the potential of the tapping 36 also rises. If it is assumed for the sake of simplicity that the fly-back pulse is sinusoidal, as is shown in Fig. 5 by the curve 13, the potential of the point 36 after rising will again drop and on termination of a half-period will have dropped so far that the diode 35 becomes conductive. As a result across the capacitor 33 a direct voltage is produced of the polarity shown in the figure, which direct voltage acts in support of the supply source 34 in the anode circuit of the tube 30.

The alternating voltage produced at the control grid 41 of the tube 30, which voltage consequently during the forward stroke of the saw-tooth current is substantially at cathode potential and during the fly-back is highly negative, comprises a direct current component which is negative, so that a negative direct voltage is produced across the resistors 43 and 44. If this voltage is driven more negative, the frequency of the oscillator is increased.

In the circuit arrangement the diode 35 is connected in parallel with part of the winding 31. As long as the diode is conductive, no voltage capable of cutting off the tube 30 can be induced in the winding. If, now, the negative direct voltage at the control grid of the tube 30 is driven more negative, the current passed by the diode 35 decreases so that this diode is cut off at an earlier instant than at the prior value of the negative direct voltage set up at the control grid. As a result the negative voltage pulse is set up at the control grid of the tube 30 at an earlier instant so that the frequency is increased.

Hereinbefore it has been assumed that during the fly-back of the saw-tooth current through the winding 31 a sinusoidal fly-back pulse is set up at the anode of the tube 30. However, if the circuit arrangement is suitably proportioned, the fly-back pulse also comprises a third harmonic. Due to the capacitance 47 provided between the anode and the suppressor grid of the tube 30 the fly-back pulse is supplied capacitively to the suppressor grid. This suppressor grid is connected to the anode of the tube 23 as has been mentioned hereinbefore but also to a resistor 46.

This resistor 46 is chosen such that it constitutes a differentiating network together with the suppressor grid-anode capacitance 47 of the tube 30. Consequently a voltage of the shape shown in Fig. 9 at 20 is supplied to the anode of the tube 23. A negative direct voltage is active in the anode circuit of the tube 23 in series with this additional pulse 20. This voltage is derived from the resistor 44 via the smoothing network comprising the parallel combination of a capacitor 48 and a resistor 49 in series with a capacitor 50.

If the amplitude of the additional pulse 20 shown in Fig. 9 is such that this pulse exceeds the absolute value of the said negative direct voltage, the anode potential of the tube 23 rises so as to exceed the cathode potential so that the tube 23 can pass current if there is coincidence with the synchronizing signal applied to the control grid of the tube. This current flows through the resistors 46 and 44 and, due to the integrating network comprising said resistor 49 and the capacitors 48 and 50, it produces the negative control voltage across the resistor 44 which voltage is supplied to the control grid 42 of the tube 30.

For the sake of completeness it should be mentioned that it is not necessary to connect the anode of the tube 23 to the suppressor grid of the tube 30 but that the upper end of the resistor 46 may also be detached from the suppressor grid and connected through a capacitor to the anode of the tube 30, which, however, requires the provision of an additional capacitor which can be dispensed with in most cases, since usually the anode-suppressor grid capacitance of the tube 30 can be used for this purpose. In addition, it is not necessary to use a self-oscillating line deflection circuit. It is only necessary that the oscillator of the line deflection circuit is of a kind the frequency of which is increased when a control voltage at a control electrode is driven more negative. As such use may, for example, be made of oscillators comprising a tuned circuit with which a reactance tube is connected in parallel in a manner such that this reactance arrangement provides an apparent negative capacitance. In such circuit arrangements, which are known per se, the apparent negative capacitance is increased when the control voltage at the control grid of the reactance tube is driven more negative, with the result that the frequency is also increased.

Multivibrator circuit arrangements are also known in which with a given adjustment the frequency is increased as the control voltage is driven more negative.

In addition, it is not necessary for the line deflection circuit to exhibit a fly-back pulse comprising a third harmonic, since an additional pulse of the required shape may also be derived from the fly-back pulse in a different manner than by differentiation only, although this manner is more complicated. In addition, the fly-back pulse need not be derived in the manner described but may, for example, be derived from the screen grid of the tube 30 or from a further winding of the transformer.

Finally it is not necessary for the negative bias voltage of the anode circuit of the tube 23 to be derived from the line deflection circuit.

The embodiment shown by way of example in the drawing has, however, the advantage that it requires only a small number of component parts.

What is claimed is:

1. A television synchronizing circuit comprising a control tube having a cathode, a control grid and an anode, a source of positive-going synchronizing pulses connected to said control grid, a source of bias voltage connected between said anode and cathode to counteract the conductivity of said tube, a deflection oscillator which is to be synchronized with said synchronizing pulses and adapted to produce periodic fly-back pulses and having a frequency-control electrode, said oscillator having the characteristic of increasing its frequency of oscillation when said frequency-control electrode is driven relatively negatively, means connected to apply said fly-back pulses to said anode with positive polarity and phased so that the trailing edges of said fly-back pulses normally overlap the leading edges of at least some of said synchronizing pulses thereby rendering said tube temporarily conductive, and direct-current conductive means connected between said anode and said frequency-control electrode, whereby the frequency of said oscillator is controlled by said synchronizing pulses.

2. A circuit as claimed in claim 1, in which said fly-back pulses comprise the shape of a sinusoidal voltage having a third harmonic, and a differentiating network connected in the path of said fly-back pulses to supply differentiated fly-back pulses to said anode.

3. A circuit as claimed in claim 1, in which said frequency-control electrode is a control grid of an oscillator tube, and including a condenser connected to said control grid whereby said bias voltage is generated across said condenser.

4. A television synchronizing circuit comprising a control tube having a cathode, a control grid and an anode, a source of positive-going synchronizing pulses connected to said control grid, a source of bias voltage connected between said anode and cathode to counteract the conductivity of said tube, a deflection circuit comprising an oscillator tube having a control electrode and an anode, a transformer having a primary winding connected to the last-named anode and having a secondary winding connected to provide a positive feedback signal to said control electrode, said source of bias voltage being connected to said control electrode and comprising means to derive a direct voltage from said positive feedback signal, said deflection oscillator being adapted to produce periodic fly-back pulses and having the characteristic of increasing its frequency of oscillation when said control electrode is driven relatively negatively, means connected to apply said fly-back pulses to the anode of said control tube with a positive polarity and phased so that the trailing edges of said fly-back pulses normally overlap the leading edges of at least some of said synchronizing pulses thereby rendering said control tube temporarily conductive, and direct-current conductive means connected between the anode of said control tube and said control electrode of the oscillator tube, whereby the frequency of said deflection circuit is controlled by said synchronizing pulses.

5. A circuit as claimed in claim 4, in which said oscillator tube includes a suppressor grid connected to the anode of said control tube, and in which said direct-current conductive means comprises an integrating network.

No references cited.